United States Patent
Goring et al.

(10) Patent No.: US 8,539,476 B2
(45) Date of Patent: Sep. 17, 2013

(54) SYSTEM AND METHOD FOR MANAGEMENT OF MUTATING APPLICATIONS

(75) Inventors: Bryan Richard Goring, Wellesley (CA); Michael Shenfield, Richmond Hill (CA); Viera Bibr, Kilbride (CA)

(73) Assignee: Motorola Mobility LLC, Libertyville, IL (US)

( * ) Notice: Subject to any disclaimer, the term of this patent is extended or adjusted under 35 U.S.C. 154(b) by 587 days.

(21) Appl. No.: 12/712,732

(22) Filed: Feb. 25, 2010

(65) Prior Publication Data

US 2010/0281472 A1  Nov. 4, 2010

Related U.S. Application Data

(63) Continuation of application No. 10/787,946, filed on Feb. 27, 2004, now Pat. No. 7,698,701.

(60) Provisional application No. 60/503,982, filed on Sep. 17, 2003.

(51) Int. Cl.
*G06F 9/44* (2006.01)
*G06F 9/45* (2006.01)

(52) U.S. Cl.
USPC ............................ 717/170; 717/158; 717/173

(58) Field of Classification Search
None
See application file for complete search history.

(56) References Cited

U.S. PATENT DOCUMENTS

| | | | |
|---|---|---|---|
| 6,571,389 B1 * | 5/2003 | Spyker et al. ................. | 717/176 |
| 7,039,591 B2 | 5/2006 | Ecklund et al. | |
| 7,134,121 B2 * | 11/2006 | Bates et al. .................... | 717/170 |
| 7,302,681 B2 * | 11/2007 | Kamalanathan .............. | 717/173 |
| 7,519,953 B2 * | 4/2009 | Reissman et al. ............. | 717/170 |
| 7,644,139 B2 * | 1/2010 | Shenfield ...................... | 709/219 |
| 7,698,701 B2 * | 4/2010 | Goring et al. ................. | 717/170 |
| 7,793,281 B2 * | 9/2010 | Goring et al. ................. | 717/170 |

(Continued)

FOREIGN PATENT DOCUMENTS

EP  1049005 A2  11/2000

OTHER PUBLICATIONS

Armstrong et al., "Efficient and Transparent Dynamic Content Updates for Mobile Clients", 2006 ACM, MobiSys'06, Jun. 19-22, Uppsala, Sweden, pp. 56-68; <http://dl.acm.org/citation.cfm?doid=1134680.1134687>.*

(Continued)

*Primary Examiner* — Thuy Dao
*Assistant Examiner* — Ben C Wang (57) ABSTRACT

A method for adapting a provisioned content of an application program on a mobile device, the content of the application being partitioned into a set of addressable logical modules, the method comprising the steps of provisioning a first group of logical modules selected from the set of logical modules to provide provisioned content on the device, monitoring execution path information of the provisioned content during execution on the device, evaluating the execution path information to adapt the provisioned content by one or more of adding logical modules to the first group from the set of logical modules, removing logical modules from the first group of logical modules or suspending logical modules from the first group of logical modules, to form a second group of logical modules, revising the first group of logical modules to correspond to the second group of logical modules to provide a revised content; and adapting the provisioned content of the application on the terminal to correspond to the revised content, during execution on the device.

14 Claims, 10 Drawing Sheets

(56) References Cited

U.S. PATENT DOCUMENTS

| | | | |
|---|---|---|---|
| 7,877,682 B2* | 1/2011 | Aegerter | 715/237 |
| 2002/0059425 A1* | 5/2002 | Belfiore et al. | 709/226 |
| 2002/0069192 A1* | 6/2002 | Aegerter | 707/1 |
| 2002/0087729 A1 | 7/2002 | Edgar | |
| 2002/0103668 A1 | 8/2002 | Ecklund et al. | |
| 2002/0129354 A1 | 9/2002 | Bryan et al. | |
| 2002/0164004 A1 | 11/2002 | Tamura et al. | |
| 2003/0069881 A1* | 4/2003 | Huttunen | 707/5 |
| 2003/0145314 A1* | 7/2003 | Nguyen et al. | 717/158 |
| 2003/0181196 A1* | 9/2003 | Davidov et al. | 455/414.1 |
| 2004/0073613 A1* | 4/2004 | Plewnia | 709/206 |
| 2004/0111476 A1* | 6/2004 | Trossen et al. | 709/206 |
| 2004/0158842 A1* | 8/2004 | Gilfix et al. | 719/328 |
| 2004/0167986 A1* | 8/2004 | Gilfix et al. | 709/230 |
| 2004/0255290 A1* | 12/2004 | Bates et al. | 717/174 |
| 2005/0060392 A1* | 3/2005 | Goring et al. | 717/170 |
| 2005/0187906 A1* | 8/2005 | Madan et al. | 707/3 |
| 2006/0101441 A1* | 5/2006 | Fulton et al. | 717/158 |
| 2007/0220089 A1* | 9/2007 | Aegerter | 709/203 |
| 2008/0137668 A1* | 6/2008 | Rodriguez et al. | 370/400 |
| 2008/0301670 A1* | 12/2008 | Gouge et al. | 717/173 |
| 2010/0313193 A1* | 12/2010 | Goring et al. | 717/170 |
| 2011/0125804 A1* | 5/2011 | Aegerter | 707/802 |
| 2011/0314089 A1* | 12/2011 | Quinn | 709/203 |
| 2012/0036494 A1* | 2/2012 | Gurumohan et al. | 717/173 |
| 2012/0151466 A1* | 6/2012 | Fadell | 717/173 |

OTHER PUBLICATIONS

Xiao et al., "A Dynamic Web Page Adaptation for Mobile Device Based on Web2.0", 2008 IEEE, pp. 119-122; <http://ieeexplore.ieee.org/stamp/stamp.jsp?tp=&arnumber=4721325>.*

Kang et al., "A Framework for Dynamic Updates of Map Data in Mobile Devices", 2005 Springer-Verlag Berlin Heidelberg, W2GIS 2005, LNCS 3833, pp. 66-77; <http://link.springer.com/content/pdf/10.1007%2F11599289_7.pdf>.*

Sirer et al.: "A Practical Approach for Improving Startup Latency in Java Applications", Feb. 26, 1999, University of Washington, Seattle, WA, USA, pp. 1-9.

Zhang et al.: "Leakage-Proof Program Partitioning", 2002, ACM, pp. 136-145.

Gu et al.: "Adaptive Offloading Interference for Delivering Applications in Pervasive Computing Environments", Pervasive Computing and Communications, Mar. 23-26, 2003, IEEE, pp. 1-8.

ISORE 2003—the 6th IEEE International Symposium on Object-oriented Real-time distributed Computing, May 14-16, 2003, pp. 1-5.

Rache et al.: "Configuration and Dynamic Reconfiguration of Component-based Applications with Microsoft.NET", ISORC 2003, University of Potsdam, Germany, pp. 1-23.

* cited by examiner

SYSTEM AND METHOD FOR MANAGEMENT OF MUTATING APPLICATIONS

CROSS-REFERENCE TO RELATED APPLICATIONS

This application is a continuation of application Ser. No. 10/787,946, filed on Feb. 27, 2004, now U.S. Pat. No. 7,698,701 the entire disclosure of which is hereby incorporated by reference for all purposes.

This application claims the benefits of earlier filed provisional application No. 60/503,982, filed Sep. 17, 2003, which is herein incorporated by reference.

BACKGROUND

The present application relates to provisioning of applications on a terminal.

There is a continually increasing number of terminals in use today, such as mobile telephones, PDAs with wireless communication capabilities, personal computers, self service kiosks and two-way pagers. Software applications which run on these terminals increase their utility. For example, a mobile phone may include an application which retrieves the weather for a range of cities, or a PDA may include an application that allows a user to shop for groceries. These software applications take advantage of the connectivity to a network in order to provide timely and useful services to users. However, due to the restricted resources of some terminals, and the complexity of delivering large amounts of data to the devices, developing and maintaining software applications remains a difficult and time-consuming task.

Markup languages, such as Extended Markup Language (XML), are becoming standard for presenting, formatting and exchanging generic data. Being implemented by virtually all platforms and environments, XML allows seamless integration of heterogeneous systems using common data interfaces. XML processing is supported by core programming languages, XML-based languages (e.g. XML Path language (XPATH), XML Query language (XQUERY)) and script language extensions (e.g. ECMAScript for XML-E4X).

Current applications, in particular for resource constrained terminals, can require excessive storage space and undesirable download times/bandwidth. For example, users of a terminal may only require access to a portion of an application, but current applications must typically be downloaded in their entirety. One example is when a user with limited permissions in an accounting application typically installs all modules of the application, including those to which access is restricted.

Systems and methods for application provisioning to obviate or mitigate the aforementioned disadvantages are disclosed herein.

SUMMARY

Current applications, in particular for resource constrained terminals, can require excessive storage space and undesirable download times/bandwidth. For example, users of a terminal may only require access to a portion of an application, but current applications must typically be downloaded in their entirety. One example is when a user with limited permissions in an accounting application typically installs all modules of the application, including those to which access is restricted. Contrary to current application management systems, there is provided methods and systems for adapting a provisioned content of an application program on a terminal, the application including a set of addressable logical modules having respective executable methods. One such method comprises the steps of provisioning a first definition of the application on the terminal, the first definition including a corresponding first group of logical modules selected from the set of logical modules. This method also evaluates the provisioned content based on execution path information of the application corresponding to the initial definition, and then determines a second definition of the application including a corresponding second group of logical modules based on the evaluation of the execution path information. The second group of logical modules is selected from the set of logical modules. This method also potentially revises the first group of logical modules to correspond to the second group of logical modules to provide a revised content, and adapts the provisioned content of the application on the terminal to correspond to the revised content.

A method is disclosed for adapting a provisioned content of an application program on a terminal, the application including a set of addressable logical modules having respective executable methods, the method comprising the steps of: provisioning a first definition of the application on the terminal, the first definition including a corresponding first group of logical modules selected from the set of logical modules; evaluating the provisioned content based on execution path information of the application corresponding to the initial definition; determining a second definition of the application including a corresponding second group of logical modules based on the evaluation of the execution path information, the second group of logical modules selected from the set of logical modules; revising the first group of logical modules to correspond to the second group of logical modules to provide a revised content; and adapting the provisioned content of the application on the terminal to correspond to the revised content.

A terminal is provided for adapting a provisioned content of an application program on a runtime environment, the application including a set of addressable logical modules having respective executable methods, the terminal comprising: a provisioning module for provisioning a first definition of the application on the terminal, the first definition configured for a corresponding first group of logical modules selected from the set of logical modules; an evaluation module for evaluating the provisioned content based on execution path information of the application corresponding to the initial definition, and determining a second definition of the application including a corresponding second group of logical modules based on the evaluation of the execution path information, the second group of logical modules selected from the set of logical modules; and a revision module for revising the first group of logical modules to correspond to the second group of logical modules to provide a revised content, and configured to adapt the provisioned content of the application on the terminal to correspond to the revised content.

Also disclosed is a computer program product for adapting a provisioned content of an application program on a runtime environment, the application including a set of addressable logical modules having respective executable methods, the computer program product comprising: a computer readable medium; a provisioning module stored on the computer readable medium for provisioning a first definition of the application on the terminal, the first definition configured for a corresponding first group of logical modules selected from the set of logical modules; an evaluation module stored on the computer readable medium for evaluating the provisioned content based on execution path information of the application corresponding to the initial definition, and determining a second definition of the application including a corresponding second group of logical modules based on the evaluation of the execution path information, the second group of logical modules selected from the set of logical modules; and a revision module coupled to the evaluation module for revising the first group of logical modules to correspond to the second group of logical modules to provide a revised content, and configured to adapt the provisioned content of the application on the terminal to correspond to the revised content.

BRIEF DESCRIPTION OF THE DRAWINGS

These and other features will become more apparent in the following detailed description in which reference is made to the appended example drawings, wherein.

DETAILED DESCRIPTION

Figure 1:
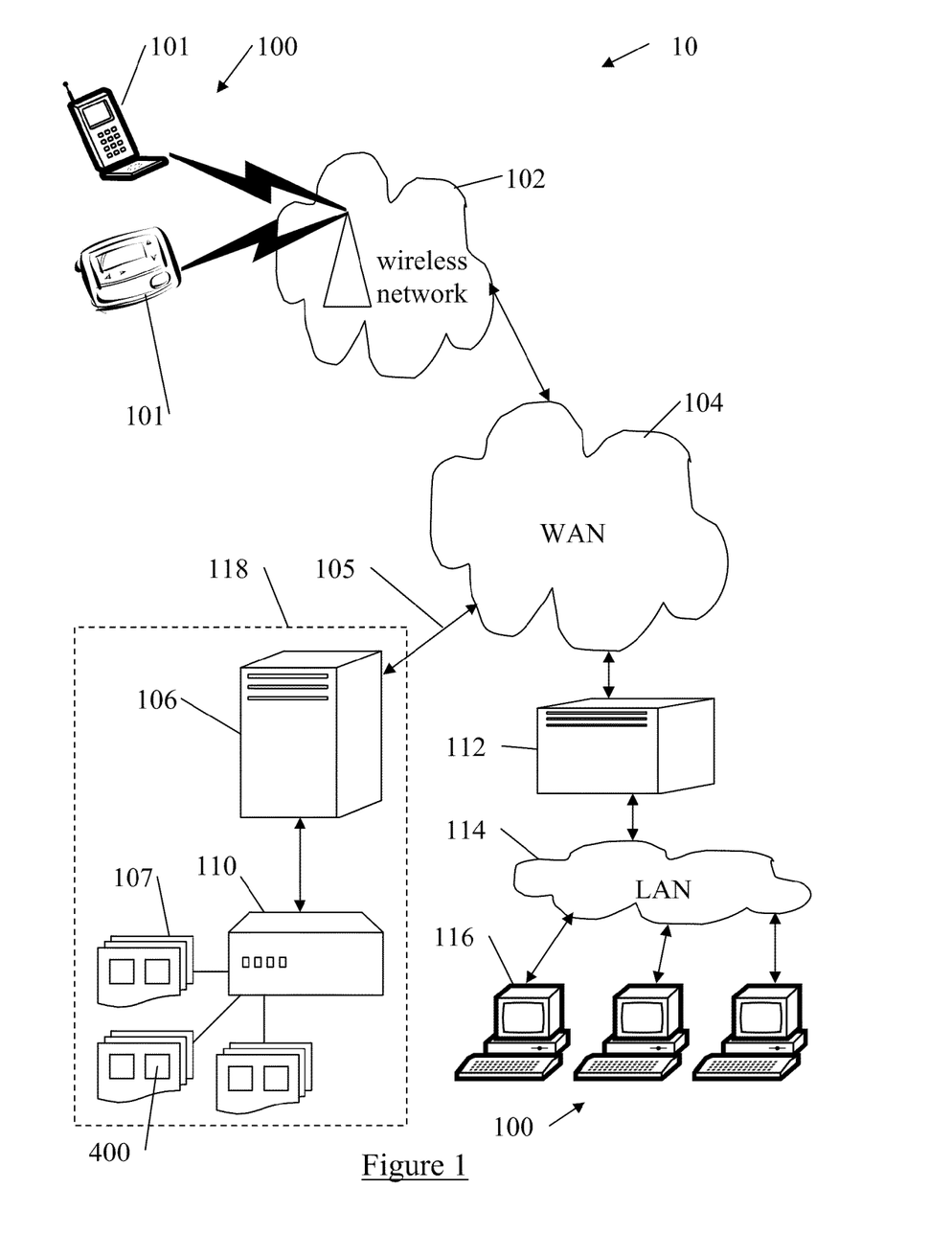
FIG. 1 is a block diagram of a network system.

Referring to FIG. 1, a network system 10 comprises a plurality of terminals 100 for interacting with one or more application servers 110 accessed by a server 106, via a coupled Wide Area Network (WAN) 104 such as but not limited to the Internet. It is recognized that the servers 110, 106 may be part of a service provider 118 providing a schema-defined service, such as but not limited to web services. The application server 110 has a series of mutable applications 107, each comprising a series of Logical Modules 400. The generic terminals 100 can be any suitable computing platform such as but not limited to personal computers 116 (i.e. wired devices), wireless devices 101, PDAs, self-service kiosks and the like. The server 106 provides access by the terminals 100 to a number of logical modules 400 of the applications 107 through messages 105.

The modules 400 for the applications 107 can be obtained by the server 106 from the application server 110. Each of the terminals 100 has a processing framework 206 (see FIG. 2) for monitoring the flow of logical modules 400 as the application 107 is implemented on the terminal 100. It is recognized that the framework 206 can implement a subset (i.e. a module envelope 402—see FIG. 3) of the modules 400 of the application 107 at any stage of the execution thereof on the terminal 100. The envelopes 402 represent the current mutating version of the application 107 provisioned on the terminal 100.

Further, the system 10 can also have a gateway server 112 for connecting the desktop terminals 116 via a Local Area Network (LAN) 114 to the server 106. Further, the system 10 can have a wireless network 102 for connecting the wireless devices 101 to the WAN 104. It is recognized that other terminals and computers (not shown) could be connected to the server 106 via the WAN 104 and associated networks other than as shown in FIG. 1. The generic terminals 100, wireless devices 101 and personal computers 116 are hereafter referred to as the terminal 100 for the sake of simplicity. Further, the networks 102, 104, 114 of the system 10 will hereafter be referred to as the network 104, for the sake of simplicity. It is recognized that there could be multiple servers 106, 110, and/or that the functionality of the servers 106 and 110 could be combined, if desired. Additionally, applications 107 and/or logical modules 400 thereof could be made available from other servers and/or data repositories connected either to servers 106, 110 and/or to the network 104.

In this system 10, the predefined application 107 is partitioned by a designer into the several non-overlapping or overlapping Logical Modules 400. Logical Modules 400 may be Code Modules 400 that drive the application 107 behaviour, or may be Data Modules 400 that define how data is represented. By partitioning of the application 107 into these discrete elements (i.e. logical modules 400), the application 107 may adapt itself dynamically at runtime on the terminal 100 by the processing framework 210 through requesting or discarding discrete elements as required. The mutating version of the application 107 can be represented by one or more envelopes 402 containing one or more logical modules 400. A structured definition language such as XML can be used to define the logical modules 400 of the application 107. Other example languages can include such as but not limited to HTML, XHTML, XSML, Resource Description Framework (RDF), Machine Readable Cataloging (MARC), and Multipurpose Internet Mail Extensions (MIME). It is further recognized that the system 10 can be suitable to any range of XML-defined applications to be used in conjunction with terminals 100 that may be limited in terms of connectivity, memory and/or storage space. For the sake of simplicity, and expressly not intended as limiting, the application 107 may hereafter be referred to as an XML application 107 for example purposes only.

Referring again to FIG. 1, the system 10 allows the wireless/wired application 107 in nascent form to evolve dynamically to suit its usage by a terminal 100, or a runtime environment executing thereon. The application 107 may consist of many discrete and separable parts (not shown) on the application server 110 that at any given time may not be in use by the terminal 100, of no use whatever to the user, or in continual use by the terminal 100. Based on execution paths taken during the application 107 lifetime on the terminal 100, parts of the application 107 description may be requested, discarded or temporarily "shelved" via caching via the processing framework 206. A range of applications 107 can be used in conjunction with terminals 100 that may be limited in terms of connectivity, memory and/or storage space.

Generic Terminal

Figure 2:
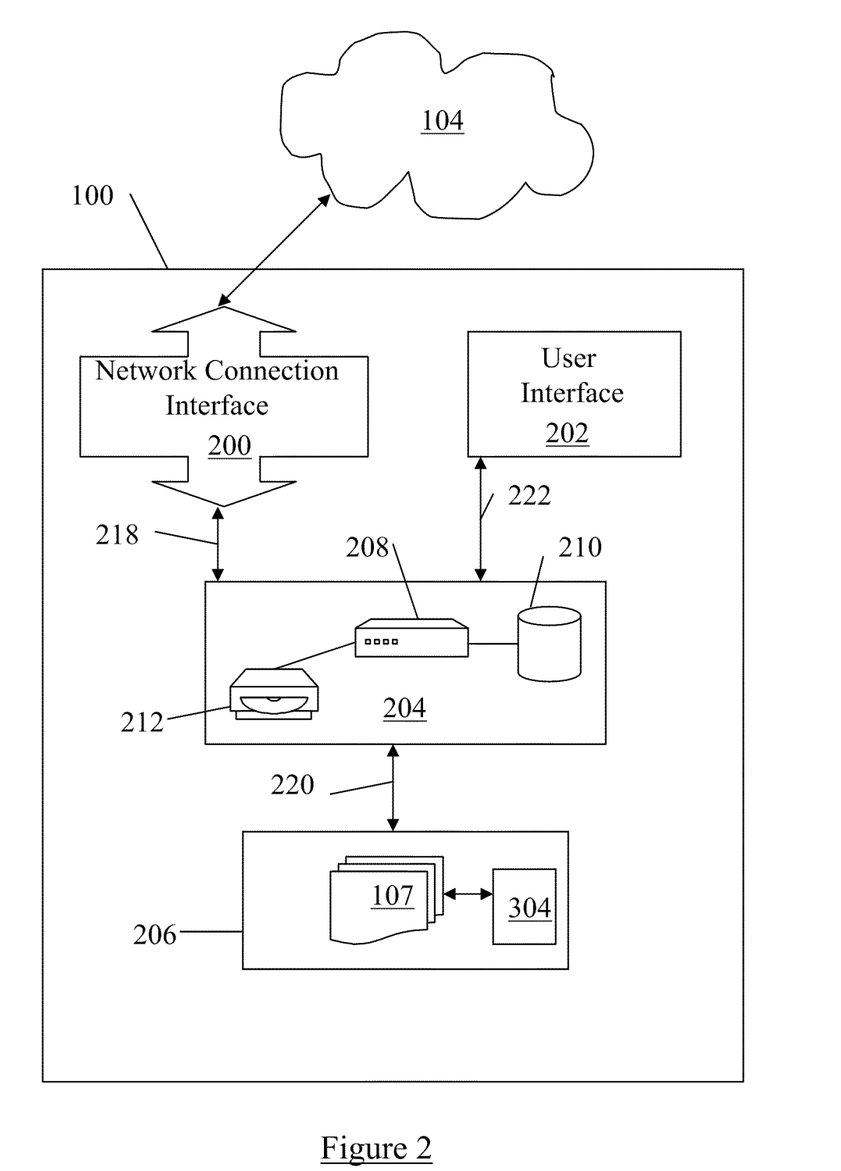
FIG. 2 is a block diagram of a generic terminal of FIG. 1.

Referring to FIG. 2, the terminals 100 can include, without limitation, mobile telephones (or other wireless devices), PDAs, notebook and/or desktop computers, two-way pagers or dual-mode communication terminals. The terminals 100 include a network connection interface 200, such as a wireless transceiver or a wired network interface card or a modem, coupled via connection 218 to a terminal infrastructure 204. The connection interface 200 is connectable during operation of the terminals 100 to the network 104, such as to the wireless network 102 by wireless links (e.g., IR, RF, etc.) (see FIG. 1), which enables the terminals 100 to communicate with each other and with external systems (such as the server 106-see FIG. 1) via the network 104 and to coordinate the requests/response messages 105 between the terminals 100 and the servers 106, 110. The network 104 supports the transmission of the mutated version of the application programs 107 in the requests/response messages 105 between terminals 100 and external systems, which are connected to the network 104. The network 104 may also support voice communication for telephone calls between the terminals 100 and terminals which are external to the network 104. A wireless data transmission protocol can be used by the wireless network 102, such as but not limited to DataTAC, General Packet Radio Service (GPRS) or Code Division Multiple Access (CDMA).

Referring again to FIG. 2, the terminals 100 also have a user interface 202, coupled to the terminal infrastructure 204 by connection 222, to facilitate interaction with a user (not shown). The user interface 202 can includes one or more user input devices such as but not limited to a QWERTY keyboard, a keypad, a trackwheel, a stylus, a mouse, a microphone and the user output device such as an LCD screen display and/or a speaker. If the screen is touch sensitive, then the display can also be used as the user input device as controlled by the terminal infrastructure 204. The user interface 202 is employed by the user of the terminal 100 to coordinate the requests/response message messages 105 over the system 10 (see FIG. 1) as employed by the processing framework 206.

Referring again to FIG. 2, operation of the terminal 100 is enabled by the terminal infrastructure 204. The terminal infrastructure 204 includes the computer processor 208 and the associated memory module 210. The computer processor 208 manipulates the operation of the network interface 200, the user interface 202 and the framework 206 of the communication terminal 100 by executing related instructions, which are provided by an operating system and client application programs 107 located in the memory module 210; the computer processor 208 can include one or more processing elements that may include one or more general purpose processors and/or special purpose processors (e.g., ASICs, FPGAs, DSPs, etc.). Further, it is recognized that the terminal infrastructure 204 can include a computer readable storage medium 212 coupled to the processor 208 for providing instructions to the processor for loading/updating client application programs 107. The computer readable medium 212 can include hardware and/or software such as, by way of example only, magnetic disks, magnetic tape, optically readable medium such as CD/DVD ROMS, and memory cards. In each case, the computer readable medium 212 may take the form of a small disk, floppy diskette, cassette, hard disk drive, solid state memory card, or RAM provided in the memory module 210. It should be noted that the above listed example computer readable mediums 212 can be used either alone or in combination.

Processing Framework

Figure 3:
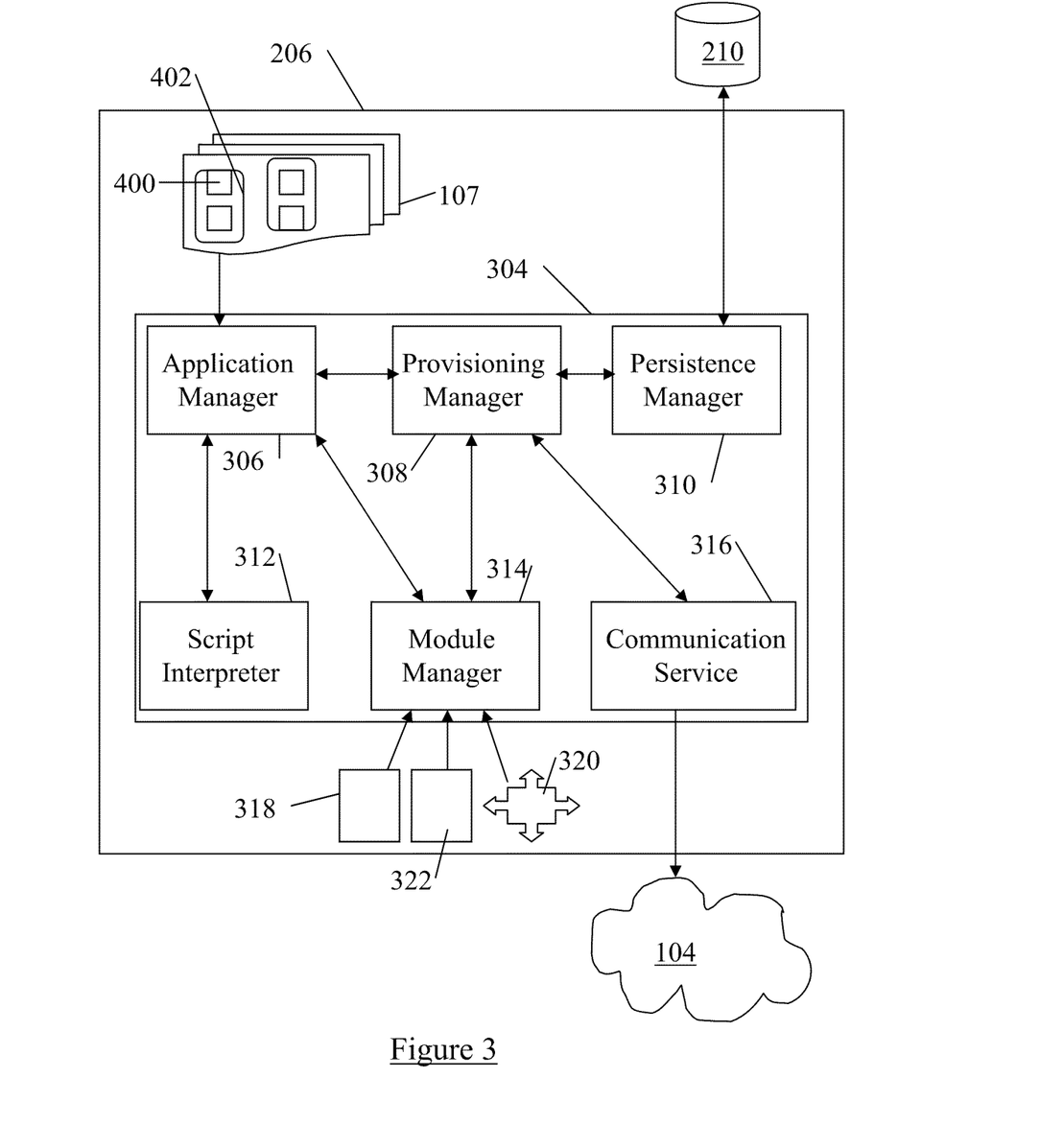
FIG. 3 shows a processing framework of the device of FIG. 2.

Referring to FIG. 3, a client runtime environment is provided by the processing framework 206. Multiple such runtime environments could potentially be available for use by the processing framework 206 of a given terminal 100. The framework 206 of the terminal 100 is coupled to the infrastructure 204 by the connection 220 and is an interface to the terminal 100 functionality of the processor 208 and associated operating system of the infrastructure 204. The client runtime environment of the terminals 100 is preferably capable of generating, hosting and executing the client application programs 107 (which are in the form of a series of modules 400) on the terminal 100; if multiple runtime environments are available, a particular one can be selected for use with a given application program 107. Further, specific functions of the client runtime environment can include such as but not limited to service 304 support for language, coordinating memory allocation, networking, management of data during I/O operations, coordinating graphics on an output device of the terminals 100 and providing access to core object oriented classes and supporting files/libraries. Examples of the runtime environments implemented by the terminals 100 can include such as but not limited to Common Language Runtime (CLR) by Microsoft® and Java® Runtime Environment (JRE) by Sun Microsystems®. It is recognized that the terminals 100 can be configured to operate as clients of the service provider 118 (for example web clients). It is recognized that the client runtime environment can also make the terminals 100 clients of any other generic schema-defined services supplied by the service provider 118.

Referring again to FIG. 3, the Processing Framework 206 of the terminal 100 manages the requests 105 (see FIG. 1) to provision additional Module Envelopes 402, remove envelopes 402 as directed or suspend envelopes 402 that are infrequently requested. These messages 105 are exchanged with the server 106 to obtain sets of logical modules 400 (i.e. module envelopes 402) in order to mutate or otherwise adapt the executed application 107 as required by the processing framework 206 (i.e. as the execution of the application 107 progresses in the runtime environment).

Suspension of one or more of the module envelopes 402 provisioned on the processing framework 206, due to infrequent reference by the user/terminal 100, preferably is performed autonomously by the Processing Framework 206 rather than triggered by server 106 (see FIG. 1) interactions or workflow actions. A suitable threshold algorithm can be used to determine the activity threshold at which respective modules 400 should be suspended, thereby providing for a dynamic adaptability of the applications 107 based on the number of corresponding provisioned modules 400 at any instance on the terminal 100. The Processing Framework 206 may choose to cache the module 400 locally or relocate it to remote storage off the terminal 100, based on a set of local performance criteria such as but not limited to space available, module size, etc.

The Processing Framework 206 can provide generic service framework 304 functionality as part of, or separate from, the application program 107. Such a generic service framework functionality can include, without limitation, an Application Manager 306, a Module Manager 314, a Provisioning Manager 308, a Communication Service 316, a Script Interpreter 312, and a Persistence Manager. Other services (not shown) can include a presentation service, an access service and a utility service. It is recognised that separate service functionality can be shared by a plurality of applications 107.

The communication service 316 manages connectivity between the component application programs 107 and the external system 10 via the network 104, including the ability to fetch additional modules 400 as required. The persistence manager 310 allows the current mutated version of the application programs 107 and/or logical/mutated modules thereof (400, 402) to be stored in the memory module 210. The provisioning manager 308 manages the provisioning of the software applications 107 on the terminal 100. Application provisioning can include storing, retrieving, downloading and removing applications 107, such as requesting and receiving new and updated modules 400, configuring the application programs 107 for access to services which are accessible via the network 104, modifying the configuration of the modules 400, and removing/adding specific modules 400 and corresponding modular envelopes 402. Further, the provisioning manager 308 can be responsible for providing APIs (application program interfaces) to the applications 107 for enabling dynamic requesting of additional modular envelopes 402 or remove same on request, as further described below. The Application Manager 306 can be used to interact with the user interface 202 (see FIG. 2), manage application lifetime, etc. The Module Manager 314 monitors application 107 reference to Module Envelopes 402 and requests the Provisioning Manager 308 to suspend modules 400 that are infrequently referenced. The Script Interpreter 312 can be used to execute the content of the Modules 400, which in some implementations can be XML content. API to provision for manipulation of Module Envelopes 402 can be available through the Script Interpreter 312. It is recognized that other configurations of the processing framework 206 with respective services 306, 308, 310, 312, 314, 316 for implementing the application 107 adaptation can be other than shown, as desired.

Application Program Modules

Figure 4:
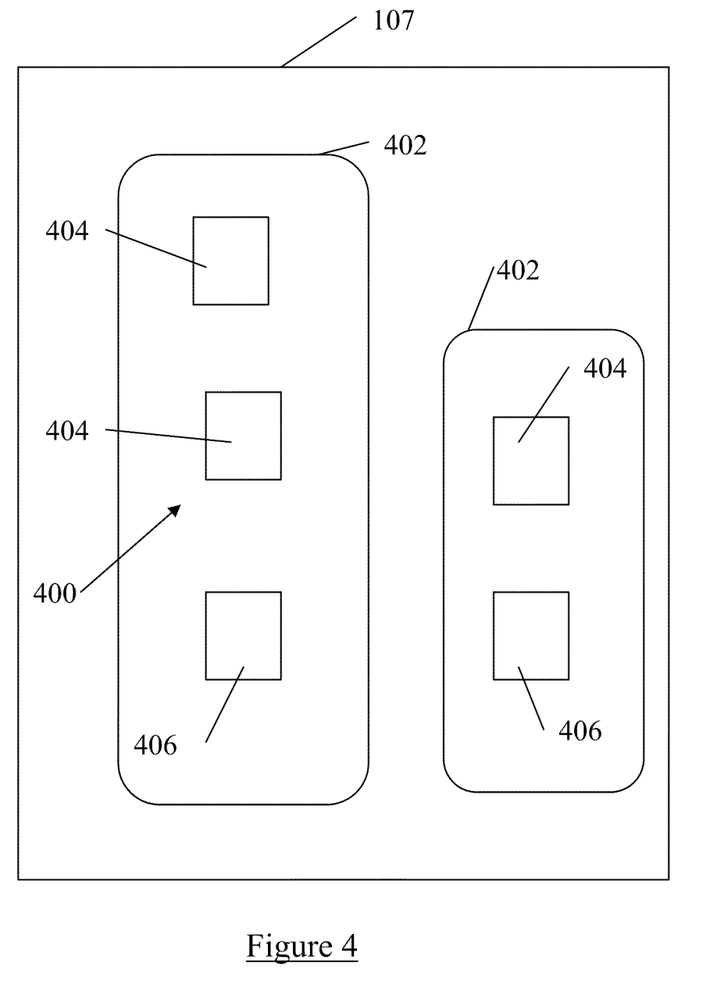
FIG. 4 is an application program of FIG. 3.

Referring to FIG. 4, the discrete elements of the application program 107 are typically grouped into the Module Envelope 402 which is a superset of modules 400 that satisfy a particular behaviour or requirement when combined. One module 400 belongs to only one group, such as but not limited to catalogue browsing, credit card validations, etc. for a shopping application. Three general behaviours for application 107 mutation are the ability to:

a) add;
b) remove; or
c) suspend a Module Envelope 402 and/or individual modules 400, which can be driven by the application 107 execution path information 318 (see FIG. 3) describing the workflow of the application 107. This execution path information 318, in some implementations, can be either a history of module 400 activity by the user/processing framework 206, a projection of expected module 400 usage based on current module 400 usage, or a combination thereof.

In the case of activity, an activity threshold algorithm 322 (see FIG. 3) can be used by the module manager 314 to decide which modules 400 should be removed by the provisioning manager 308 of the processing framework 206. Further, the module manager 314 also makes use of a suitable addressing scheme 320 that provides information of the interconnectivity of the modules 400 and their contained execution functions. All modules 400 are addressable via the Addressing Scheme as represented by the addressing map 320. The Addressing Scheme can be an algorithm by which any Module 400 may be uniquely identified. The process of adaptation of the provisioned content of the application 107 on the terminal may be driven by; outcome during execution of any Module Envelope 402 operation and/or the result of server 106 (see FIG. 1) interaction to control application 107 mutation (i.e. provisioned content). The Processing Framework 206 resolves the references of the addressing scheme 320 dynamically, enhancing the application 107 where necessary to provide missing modules 400 by provisioning the appropriate Module Envelopes 402, for example. It is recognised that the provisioned content of the application can include selected modular envelopes 402 and/or individual modules 400.

Referring again to FIG. 4, the example application 107 has a current set of provisioned logical modules 400 selected from the total set of application logical modules. The interconnectivity of the modules 400 is represented by the addressing scheme 320 (see FIG. 3) to support reference between Logical Modules 400. Each module 400 represents a single indivisible representation within the application 107, i.e. the atomic parcels into which the application 107 is partitioned. The application 107 can be originally partitioned by a designer (not shown) into several non-overlapping and/or overlapping Logical Modules 400, which can be grouped by type. Logical Modules 400 may be Code Modules 404 that drive the application 107 behaviour, or may be Data Modules 406 that define how data is represented.

Referring again to FIG. 4, the Logical Module 400 may comprise a task to perform (e.g. the Code Module 404) and/or may describe an entity referenced or manipulated in the application 107 (e.g. the Data Module 406). The Code Module 404 can be used to represent a collection of instructions (script/code) that satisfy an identifiable, unique and reusable task, and are therefore collectively can serve as the code of the application 107. Code Modules 404 are executed within the Processing Framework 206 (see FIG. 3) and may request that another addressable element (such as one of the Module Envelopes 402) be removed if deemed no longer necessary. The Data Module 400 can be used to represent an aggregate that describes an application 107 component, such as but not limited to tangible elements for example data description, message description, screen description, etc. Such descriptions can be provided in a suitable structured definition languages such as XML.

Referring again to FIG. 4, the Module Envelopes 402 are a collection of similar Data 406 and Code 404 modules that when grouped satisfy a common purpose. The Module Envelope 402 defines a set of operations that upon evaluation may influence the mutation of the application 107. The Module Envelope 402 can be addressable in the same fashion that Code 404 and Data 406 Modules are addressable. The Module Envelope 402 preferably is the target of manipulation (such as add, remove, suspend) by the Processing Framework 206 (see FIG. 3) as it is convenient for the developer that similar or related Logical Modules 400 be arranged in the modular envelope 402 groups. Requests for mutation of the application 107 based on the execution pathway information 318 (see FIG. 3), for example, can then be addressed directly to these groups.

Accordingly, as described above, as the user of the terminal 100 navigates through the application 107, new/updated modules 400 and/or module envelopes 402 are downloaded from the server 106 (see FIG. 1) by the processing framework 206 (see FIG. 3) and activated as needed by the user and/or terminal 100 to progress through the application 107 sequence. At the same time old modules 400 and/or module envelopes 402 can be removed from the terminal 100 or otherwise deleted from the active memory of the terminal infrastructure 204 (see FIG. 3).

Provisioning Modes

The adaptable provisioning model for applications 107 can be based on a variety of factors such as but not limited to application settings, user preferences, and/or provisioned execution context. It is recognized that the execution context can monitor the provisioning of related groups of the application 107, and the settings/preferences can be customizable by the user.

For example, for an On Demand mode, the provisioning component of the Processing Framework 206 exposes an API to the application Code Modules 404 to request: adding a new Module Envelope 402; suspend and/or remove an existing Module Envelope 402. The provisioning API of the processing framework 206 (see FIG. 3) supports the Addressing scheme 320 to identify the entity module 402, 400 to be manipulated. On demand, the provisioning manager 308 mutates or otherwise adapts the application 107 as requested by the Code Module 404.

For example, for a By Reference mode, the provisioning component of the Processing Framework 206 can inherently support the ability to download the required Module Envelope 402 and mutate the application 107 when a non-existent entity (i.e. module 400) is referenced. This reference can be made following the conventions of the Addressing Scheme 320 as represented in the execution pathway information 318.

For example, for a Autonomous provisioning mode, the Processing Framework 206 may decide that a particular Module Envelope 402 is referenced infrequently and so may be suspended. Suspension is coordinated with the provisioning manager 308 such that the suspended entity may cached: locally on the limited resource terminal, or remotely on the Mobile Server 106 or another coupled external persistent medium.

Mutating Application Model Example

The application 107 example shows groups of related Code and Data Modules (Module Envelopes) enhancing the application 107 as the user follows different execution paths. FIGS. 5 through 8 demonstrate the progression of module envelope 402 acquisition and application 107 mutation through adaptive provisioning. The application 107 in this example is represented by a personnel management and scheduling application; the server provider 118 is represented by the company deploying and managing the personnel and the application 107.

Figure 5:
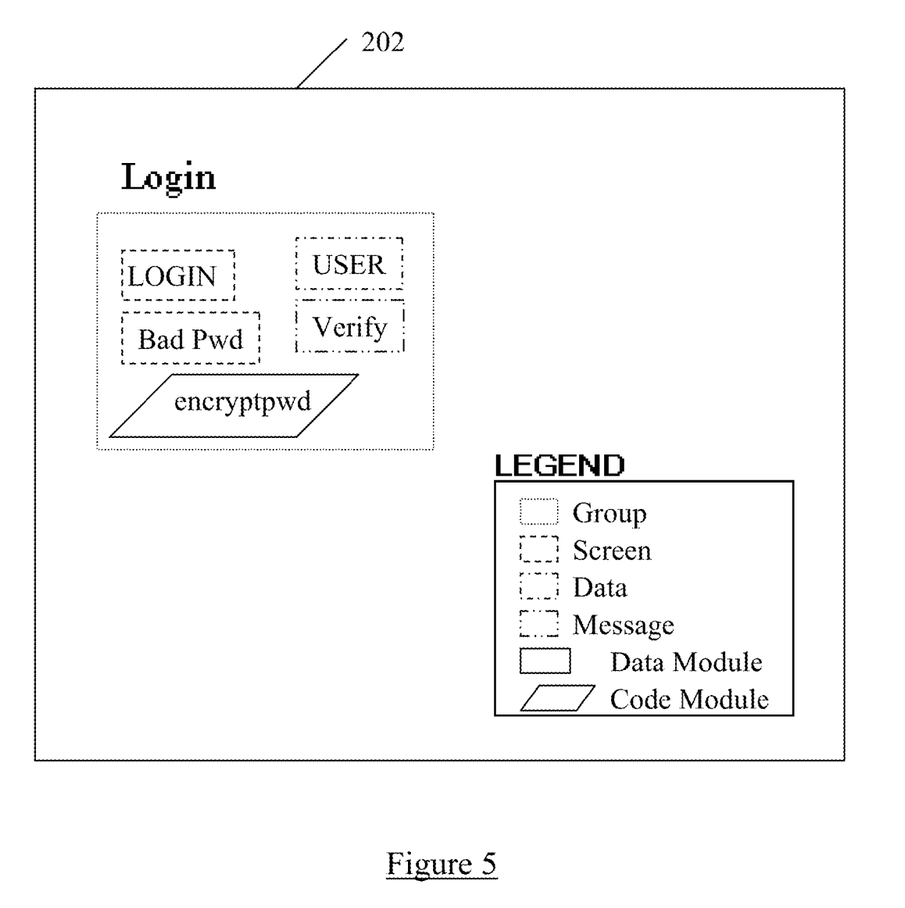
FIG. 5 is an example nascent workflow application program of the program of FIG. 3.

Referring to FIG. 5, a nascent form of the application 107 is shown, which represents the application 107 in its most fundamental initial form prior to additional provisioning. In this diagram the application 107 is installed in its most basic form, where no prior login has been performed. A contracting company 118 (see FIG. 1) deploys this exemplary application 107 that allows its mobile workforce of customer reps, repair technicians and administrative personnel to continuously update its business workflow. The company 118 employs a small number of customer reps that visit customer sites and enter new business and problem reports. The vast majority of repair technicians handle air-conditioning unit engineering assessment and installation, while a small group of individuals do heating and pool installation. The user login screen has been provisioned on the terminal 100 by the processing framework 206. Referring to FIGS. 4 and 5, the "Login" modular envelope 402 contains the four data modules 406 and the one code module 404 as labeled. The "Login" and "Bad Pwd" buttons represent screen data modules 406, the "User" button represents a data content data module 406, and the "Verify" button represents message data modules 406.

Figure 6:
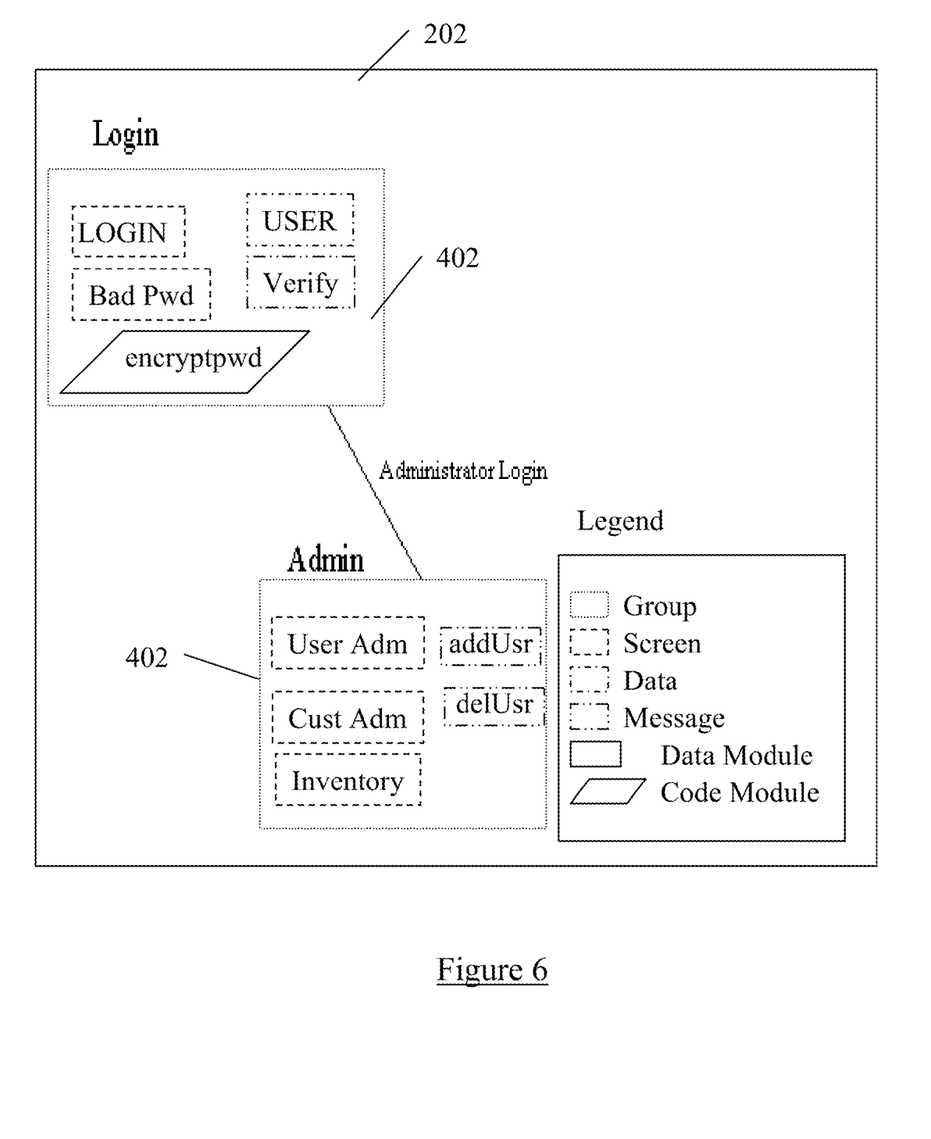
FIG. 6 shows an adapted version of the application program of FIG. 5.

Referring to FIGS. 4 and 6, the user has now logged in with Administrator privileges-. The Processing Framework 206 reacts to a request within the application 107 workflow to request Code 404 and Data 406 Modules corresponding to the Administrator login. Accordingly, the administrator user has had a further "Admin" modular envelope 402 provisioned on their terminal 100 by the processing framework 206, in addition to the "Login" envelope 402. The "Admin" envelope 402 has additional data modules as labelled.

Figure 7:
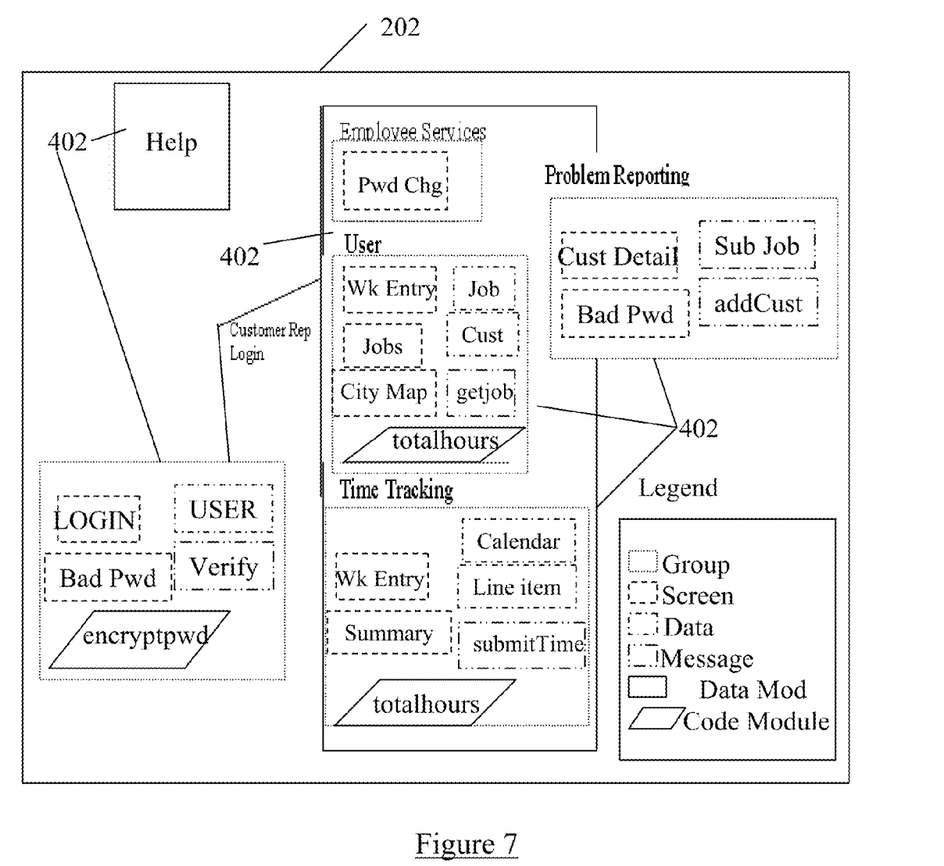
FIG. 7 is a further example of the application program of FIG. 6.

Referring to FIGS. 4 and 7, under an alternate scenario where the user of the application 107 is a field personnel, the User group of Code 404 and Data 406 Modules are requested by the Processing Framework 206. The application 107 evolution for a customer rep is depicted in FIG. 7. The customer rep needs the ability to enter problem and customer details. A set of generic capability groups, "Employee Services", "User", "Time Tracking" and "Problem Reporting" modular envelopes 402, allow the customer rep to track their time, manage their account and perform typical employee activities. A further "Help" modular envelope 402 of Data Modules 406 may be provisioned in the future (i.e held in suspension) by the processing framework 206 in evaluation of the execution pathway information 318 if the user requests help on a workflow screen of the terminal 100.

Figure 8:
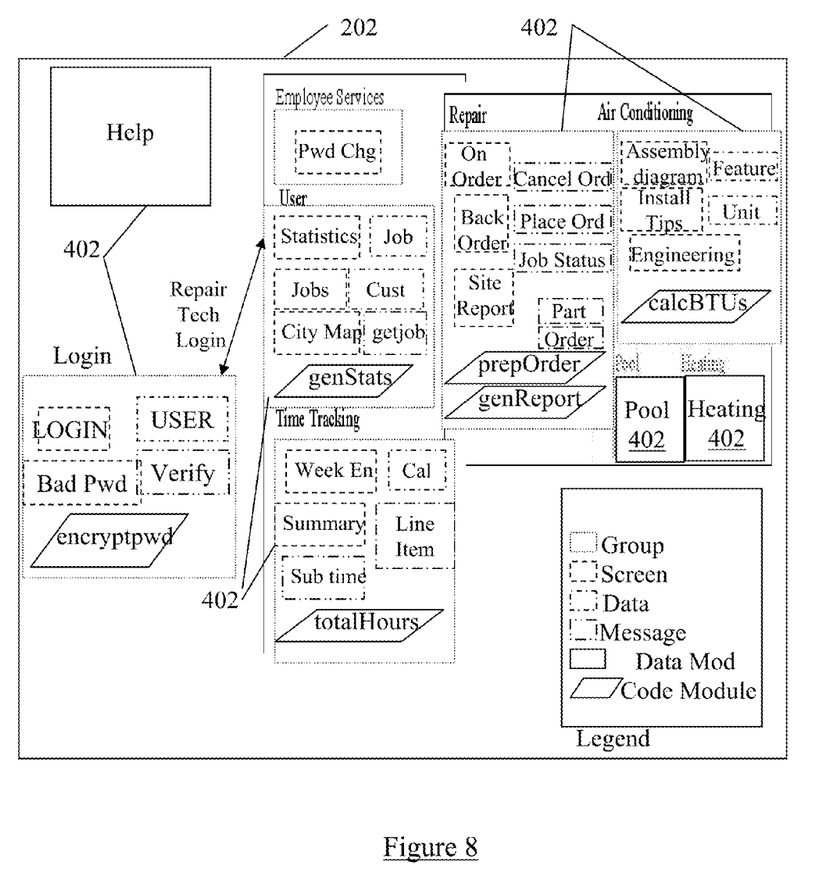
FIG. 8 is a further example of the application program of FIG. 6.

Finally, referring to FIGS. 4 and 8, under a separate type of login corresponding to a repair technician, a "Repair" modular envelope 402 group of Data 406 and Code 404 modules is provisioned by the Processing Framework 206 for display on the user interface 202 of the terminal 100. A default configuration including "Air Conditioning" modular envelope 402 group of Data 406 and Code 404 Modules is added to the mutated application 107, and "Heating" and "Pool" modular envelope 402 groups are reserved (i.e. in suspension) to be provisioned on request, i.e. resident on the terminal but not yet added to the provisioned content of the application 107.

Application Mutation Operation

The following example operation 900 (see FIG. 9) serves to illustrate how the modules 400 would interact to permit mutation of the basic application 107. Referring to FIGS. 5-8, the example application 107 assumes that the "Login" Module Envelope 402 now exports an operation or execution method called verifyLogin( ). The execution of verifyLogin( ) will cause the application 107 to be adapted on the terminal 100 based on whether an admin or general user login is done.

Figure 9:
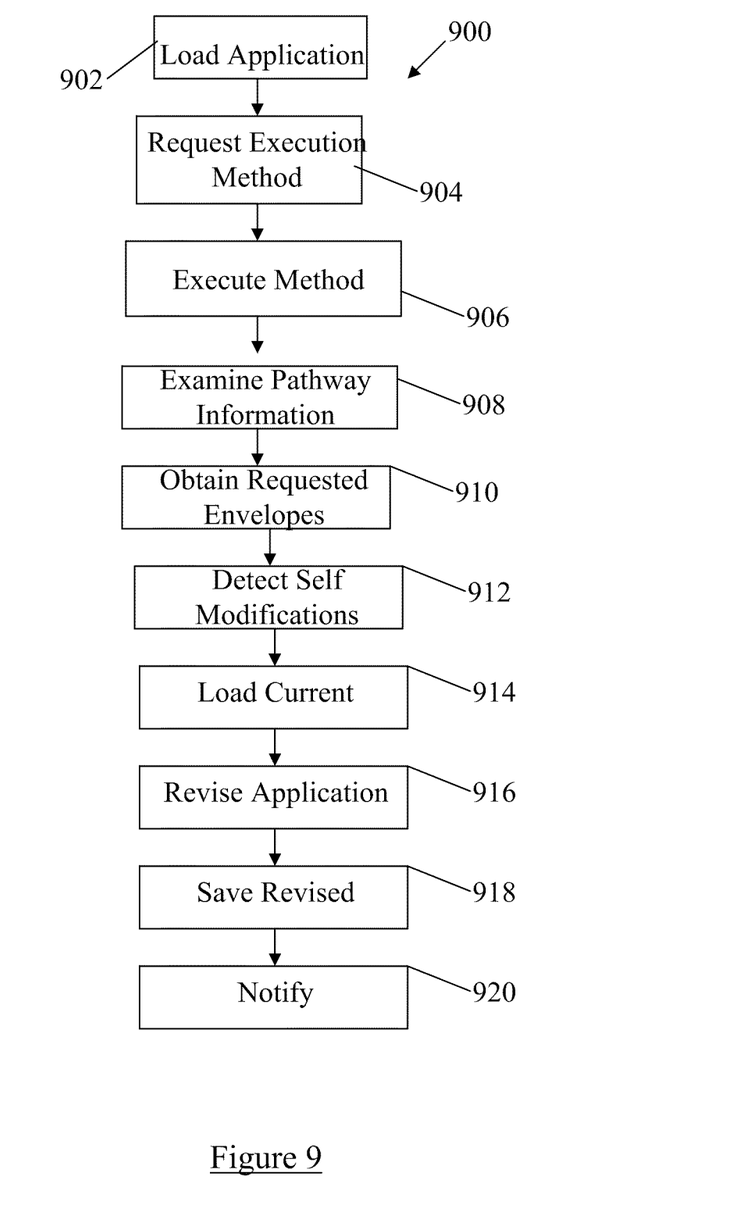
FIG. 9 is an example operation of the program of FIG. 5.
Figure 10:
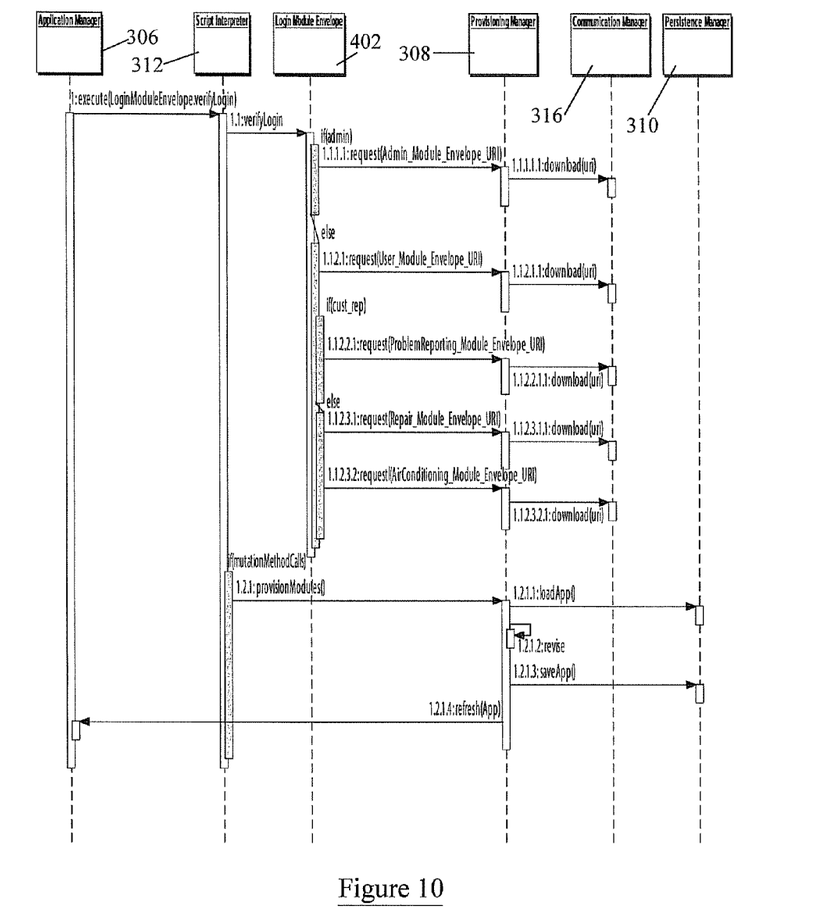
FIG. 10 shows Processing Framework component interactions for the operation of FIG. 9.

Referring to FIGS. 3 and 9, the Application Manager 306 loads 902 and is executing the exemplary Mobile Workforce application 107 and the "Login" Module Envelope 402 of, for example, XML structures currently being represented (screens etc) on the user interface 202. Next example steps are as follows:

1. The representation of some Data Module 406 within the Application Manager 306 requires that the verifyLogin( ) method be executed;
2. The Application Manager 306 requests 904 that the Script Interpreter 312 execute the verifyLogin( ) operation of the "Login" Module Envelope 402;
3. The Script Interpreter 312 initializes 906 the runtime of the terminal 100 for verifyLogin( ) and executes it;
4. During execution of verifyLogin( ) the type of login is examined 908 and conditional branching of the execution pathway information 318 determines which additional Module Envelopes 402 should be requested. For example, in the case that the login corresponds to a Repair Technician, the "Repair" Module Envelope 402 and "Air Conditioning" Module Envelope 402 are requested. This request can be triggered by an instruction in the language of the Code Module 404 representing the operation;
5. In each case the Provisioning Manager 308 utilizes the Communication Manager 316 to obtain 910 the requested Module Envelopes 402 from the server 106 according to, for example, a URI specification that identifies the envelopes 402 uniquely;
6. At the end of execution of the verifyLogin( ) operation, the Script Interpreter 312 detects 912 if any self modifications have been requested and instructs the Provisioning Manager 308 to complete the provisioning process on the newly introduced Module Envelopes 402. An alternate solution may attempt to modify the application 107 at each request for a new Module Envelope 402 rather than collect and assemble the new application 107 in one step;
7. The Provisioning Manager 306 loads 914 the current application 107 definition from the Persistence Manager 310, revises 916 the application 107 with the new Module Envelopes 402 and saves 918 the application 107; and
8. In the last step, the Provisioning Manager 308 notifies 920 the Application Manager 306 of the changes by refreshing the current application 107 to include the new modular envelopes 402.

Accordingly, in view of the above, implementation of the system 10 for adaptation of a provisioned application 107 can help to reduce the application 107 footprint due to partitioning of the application 107 into individual Code 404 and Data 406 Modules, as only the necessary elements need reside on the device. Further, it is recognized that a reduced subset of modules 400 are transferred to the terminal 100 for the typical configuration of the application 107. Further, it is recognized that a single application 107 may address more types of functionality without unnecessarily burgeoning the limited terminal 100. Further, individual Code 404 and Data 406 Modules may be reused by other resident applications 107 on the terminal 100.

The above description relates to one or more exemplary systems and methods. Many variations will be apparent to those knowledgeable in the field, and such variations are within the scope of the application. It is recognized that structured definition languages other than XML can be used, as well as a plurality of different terminals, such as PC's, PDA's, kiosks, mobile devices. The terminals can be deployed on wired and/or wireless network topologies. For example, it is recognised that implementation of the application provisioned content adaptation can be performed by a provisioning module, an evaluation module for interacting with the information 318, and a revision module for provisioning the revised content of the application. These modules can be made available on the terminal 100 as software, hardware, or a combination thereof.

The embodiment of the invention in which an exclusive property or privilege is claimed are defined as the following:

1. A method for provisioning an application on a mobile device, the application having a plurality of module envelopes, the method comprising:
    determining an operation corresponding to a module envelope required for representing a data module, wherein the modular envelope includes a plurality of related logical modules for satisfying a common purpose and wherein the plurality of logical modules includes at least one of a data module for providing data information and a code module for performing a task;
    executing the operation on the mobile device and representing the data module;
    determining an execution path information of the module envelope, the execution path information including an activity history, a projected activity of the module envelope or a combination thereof, wherein the module envelope includes a subset of logical modules into which the application is partitioned;
    determining a second module envelope required based on the execution path information;
    requesting the second module envelope from a remote server; and
    updating the application to include the second modular envelopes and wherein the data module represents an aggregate expressed in a structured definition language updating the application to include the second modular envelopes.

2. The method according to claim 1, wherein the code module has a collection of instructions to provide a reusable function performing the task.

3. The method according to claim 1, further comprising configuring the mobile device as a client of a schema defined service accessible through a network, the schema defined service providing to the mobile device the modules for adaptation of the application.

4. The method according to claim 3, wherein the schema defined service is a web service.

5. The method according to claim 1 further comprising implementing a service framework by the runtime environment for providing service functionality to the application.

6. The method according to claim 5, wherein the service framework is shared between a plurality of applications.

7. A mobile device for adapting a provisioned content of an application, the mobile device comprising;
    a processor executing a runtime environment;
    an application manager determining an operation corresponding to a module envelope required for representing a data module, wherein the modular envelope includes a plurality of related logical modules for satisfying a common purpose and wherein the plurality of logical modules includes at least one of a data module for providing data information and a code module for performing a task;
    a script interpreter executing the operation on the mobile device and representing the data module;
    a module manager determining an execution path information of the module envelope, the execution path information including an activity history, a projected activity of the module envelope or a combination thereof, wherein the module envelope includes a subset of logical modules into which the application is partitioned;
    a provisioning manager determining a second module envelope required based on the execution path information; and
    a communication service requesting the second module envelope from a remote server; wherein the provisioning manager updates the application to include the second modular envelopes and wherein the data module represents an aggregate expressed in a structured definition language updating the application to include the second modular envelopes.

8. The mobile device according to claim 7, wherein the code module has a collection of instructions to provide a reusable function performing the task.

9. The mobile device according to claim 7, wherein the mobile device is configured as a client of a schema defined service accessible through a network, the schema defined service providing to the mobile device the modules for adaptation of the application.

10. The mobile device according to claim 9, wherein the schema defined service is a web service.

11. The mobile device according to claim 7, further comprising a service framework in the runtime environment for providing service functionality to the application.

12. The mobile device according to claim 11, wherein the service framework is shared between a plurality of applications.

13. The mobile device according to claim 7, further comprising application program interfaces for enabling dynamic adaptation of the data module.

14. A non-transitory computer readable storage medium storing instructions or statements for use in the execution in a computer of a method for provisioning an application on a mobile device, the application having a plurality of module envelopes, the method comprising
    determining an operation corresponding to a module envelope required for representing a data module, wherein the modular envelope includes a plurality of related logical modules for satisfying a common purpose and wherein the plurality of logical modules includes at least one of a data module for providing data information and a code module for performing a task;

executing the operation on the mobile device and representing the data module;
determining an execution path information of the module envelope, the execution path information including an activity history, a projected activity of the module envelope or a combination thereof, wherein the module envelope includes a subset of logical modules into which the application is partitioned;
determining a second module envelope required based on the execution path information;
requesting the second module envelope from a remote server; and
updating the application to include the second modular envelopes and wherein the data module represents an aggregate expressed in a structured definition language updating the application to include the second modular envelopes.

* * * * *